United States Patent [19]
Daaboul et al.

[11] 4,357,491
[45] Nov. 2, 1982

[54] METHOD OF AND APPARATUS FOR DETECTING SPEECH IN A VOICE CHANNEL SIGNAL

[75] Inventors: Fouad Daaboul, Verdun; Tiu Le Van, Touraine, both of Canada

[73] Assignee: Northern Telecom Limited, Montreal, Canada

[21] Appl. No.: 187,816

[22] Filed: Sep. 16, 1980

[51] Int. Cl.³ .............................................. G10L 1/04
[52] U.S. Cl. .............................. 179/1 SP; 179/1 VC; 179/1 P
[58] Field of Search ................ 179/1 SC, 1 P, 1 VC, 179/1 VL; 370/81; 455/116, 218, 219–223; 375/99, 103

[56] References Cited
U.S. PATENT DOCUMENTS

| | | | |
|---|---|---|---|
| 3,712,959 | 1/1973 | Farriell | 179/1 VC |
| 3,832,491 | 8/1974 | Sciulli et al. | 179/1 VC |
| 3,832,493 | 8/1974 | Clark | 179/15 AS |
| 3,878,337 | 4/1975 | Fariello | 179/1 VC |
| 4,008,375 | 2/1977 | Lanier | 179/1 VC |
| 4,028,496 | 6/1977 | LaMarche et al. | 179/15 AS |
| 4,052,568 | 10/1977 | Jankowski | 179/15 AS |
| 4,057,690 | 11/1977 | Vagliani et al. | 179/15 AS |
| 4,277,645 | 7/1981 | May | 179/1 SC |

OTHER PUBLICATIONS

Electronics (International), "Phone Setup Doubles Channel Capacity", Mar. 17, 1977, pp. 9E, 10E.

Primary Examiner—Emanuel S. Kemeny
Attorney, Agent, or Firm—R. John Haley

[57] ABSTRACT

Speech signal presence is decided based on the input signal exceeding either of two thresholds: one, a fixed threshold (TF) set at an arbitrary level relatively high above anticipated noise; the other, an adaptive threshold (TL) which idles slightly above noise. If the input signal rises above the idling threshold of TL, speech presence is indicated. If the input signal continues to rise (i.e., amplitude-time slope positive), the presence indication continues. If the input signal level falls, the adaptive threshold is adjusted (TL=BT+D, where for example B=1, D=5 and T=the current signal sample average value). Hangover is controlled by the amount of time the input signal exceeds the threshold TL. Speech presence is also indicated if the input signal exceeds a third threshold (TH) which is also adaptive, and idles at a relatively high level above noise.

13 Claims, 4 Drawing Figures

METHOD OF AND APPARATUS FOR DETECTING SPEECH IN A VOICE CHANNEL SIGNAL

This invention relates to a method of, and a speech detector for, detecting the presence of speech signals in a sampled voice channel signal.

Speech detectors are used in a variety of speech transmission systems in which speech transmission paths are established in response to the detection of speech activity on a voice channel. One such system is a digital speech interpolation (DSI) transmission system, such as the system described and claimed in copending U.S. patent application No. 187,821 filed concurrently herewith, the disclosure of which is incorporated herein by reference, which embodies the speech detector of this invention.

A speech detector should ideally be highly sensitive to the presence of speech signals while at the same time remaining insensitive to non-speech signals such as noise. A difficulty arises in distinguishing, quickly and accurately, between speech signals, particularly at low levels, and noise. In a DSI transmission system, for example, the speech detector should be able to detect speech signals at low levels in order to avoid excessive clipping of speech signals at the start of speech utterances, but at the same time should not respond to noise alone, even at relatively high levels, because this would undesirably increase the activity of the DSI transmission.

Various forms of speech detector have been devised in order to distinguish more reliably between speech signals and noise. For example, Fariello U.S. Pat. No. 3,878,337 issued Apr. 15, 1975 discloses an arrangement in which a predetermined sequence of the sign of successive samples of a voice channel signal is detected to provide an indication of speech. LaMarche et al U.S. Pat. No. 4,028,496 issued June 7, 1977 discloses an arrangement in which the detection sensitivity and noise rejection are improved by accumulating weighted differences between signal samples and their short-term running average. Furthermore, Vagliani et al U.S. Pat. No. 4,057,690 issued Nov. 8, 1977 discloses an arrangement in which segments of the envelope of a voice channel signal are compared with one another over different time domains in order to distinguish between speech signals and noise. However, these arrangements do not fully satisfy the requirements, of a speech detector in a DSI transmission system, of distinguishing between low levels of speech and noise and avoiding clipping of the speech signals at the start of speech utterances, and accordingly a need still exists for an improved speech detection arrangement which satisfies these requirements.

Accordingly, an object of this invention is to provide an improved method of, and speech detector for, detecting the presence of speech signals in a sampled voice channel signal.

According to this invention there is provided a method of detecting the presence of speech signals in a sampled voice channel signal, comprising the steps of: producing a first signal state whenever the magnitude of a signal sample exceeds a first threshold level; comparing the magnitude of each sample with that of the preceding sample; whenever the magnitude of a sample is not greater than that of the preceding sample, setting a second threshold to a level which is greater than and is dependent upon the magnitude of the current sample; whenever the magnitude of a sample is greater than that of the preceding sample, producing a second signal state if the magnitude of the current sample exceeds the second threshold level; and in response to each of the first and second signal states, producing a signal, representing the presence of speech, at least in respect of the current sample.

Thus in accordance with this invention the speech detection is effected in two separate parts, associated with the production of the first and second signals respectively. The first threshold is set to be above anticipated noise levels, so that the first signal state is produced only at relatively high levels of speech signals, which high levels exceed the first threshold level and accordingly can not be noise. The second threshold level is adaptively adjusted to be a little above the level of noise on the relevant channel. When the sampled signal magnitude rises above this second threshold level, the second signal state is produced immediately. If, as at the start of a speech utterance, the signal magnitude continues to increase in successive samples, the second signal state continues to be produced for these samples. If, on the other hand, the signal magnitude falls again the second signal state is no longer produced and the second threshold level is adaptively adjusted.

Thus this arrangement provides a rapid detection of speech signals at low levels at the start of speech utterances.

In order that the signal, representing the presence of speech, is not terminated during short pauses in speech such as occur between syllables, so-called hangover periods are desirably provided to maintain the speech indication for a number of samples following the last sample which caused the indication to be produced. To this end, the method preferably includes the steps of: whenever the magnitude of a sample does not exceed the first threshold level and the first signal state was produced in respect of the preceding sample, producing a third signal state in respect of a first predetermined number of consecutive samples commencing with the current sample; whenever the magnitude of a sample is not greater than that of the preceding sample and the second signal state was produced in respect of said preceding sample, producing a fourth signal state in respect of a second number of consecutive samples commencing with the current sample; and producing the signal representing the presence of speech in response to each of the third and fourth signal states.

The second number of consecutive samples is desirably varied in dependence upon the reliability with which the second signal is produced in respect to each sample, in order that a speech indication is not produced for a long hangover period in response to a spurious noise signal which has resulted in the production of the second signal state. Accordingly, the method preferably also includes the step of determining said second number in dependence upon previous sample magnitudes, said second number being increased by a predetermined amount, up to a maximum number, for each sample in respect of which the second signal state is produced, and being decreased, drawn to a minimum number for each sample whose magnitude is not greater than the magnitude of the preceding sample.

Thus the hangover period which is associated with the production of the second signal state is gradually increased, up to a maximum period, as the reliability of speech signal detection increases due to successive increases in the signal level in successive samples. The hangover period associated with the production of the first signal state need not be variable because this first signal state is only produced for relatively high signal levels for which the reliability of the speech signal indication is very high.

Due to fluctuating signal levels, it can occur that successive signals samples of a magnitude below the first threshold level initially rise at the start of a speech utterance, then fall slightly so that the second threshold level is set to a higher value and the second signal state is not produced, and then rise again to a value which is above the previous values for which the second signal state was produced but which is below the new, higher, second threshold level. It is desirable that the second signal state also be produced in these circumstances. Accordingly, the method preferably further includes the steps of: whenever the magnitude of a sample exceeds that of the preceding sample, and in respect of said preceding sample the fourth signal state was produced but the second signal state was not produced, producing the second signal state in respect of the current sample if its magnitude exceeds a third threshold-/level; and setting the third threshold level equal to the magnitude of the preceding sample whenever the second signal state was produced in respect of said preceding sample and the magnitude of the current sample is not greater than the magnitude of said preceding sample.

In order to reduce the influence of spurious noise signals and d.c. offsets on the speech detector, preferably each signal sample is constituted by an average of a plurality of individual samples of the voice channel signal, the method further comprising the step of producing each signal sample by removing d.c. offsets from and averaging a plurality of individual samples of the voice channel signal. The averaging is particularly easy to achieve in a DSI transmission system of the type described in copending U.S. patent application No. 187,821, already referred to, in which updating of the speech decision for each channel takes place only once every superframe, each superframe comprising a plurality of frames each including a sample of each voice signal channel.

It will be appreciated that the steps of the method of this invention can be carried out by individual components such as comparators, stores, and gates, or by one or more programmed read-only memories.

Accordingly, the invention also extends to a speech detector comprising one or more ready-only memories programmed and arranged to carry out the method recited above.

Furthermore, the invention extends to a speech detector for detecting the presence of speech signals in a sampled voice channel signal, comprising: means for producing a first signal state whenever the magnitude of a signal sample exceeds a first threshold level; means for generating a second threshold; means for delaying each sample until the next sample; means for comparing the magnitude of each sample with that of the preceding sample delayed by said delaying means; means, responsive to said comparing means determining that the magnitude of a sample is not greater than that of the preceding sample, for setting the second threshold to a level which is greater than and is dependent upon the magnitude of the current sample; means, responsive to said comparing means determining that the magnitude of a sample is greater than that of the preceding sample, for producing a second signal state if the magnitude of the current sample exceeds the second threshold level; and means responsive to each of the first and second signal states for producing a signal, representing the presence of speech, at least in respect of the current sample.

The invention will be further understood from the following description of a preferred embodiment thereof with reference to the accompanying drawings, in which.

Figure 1:
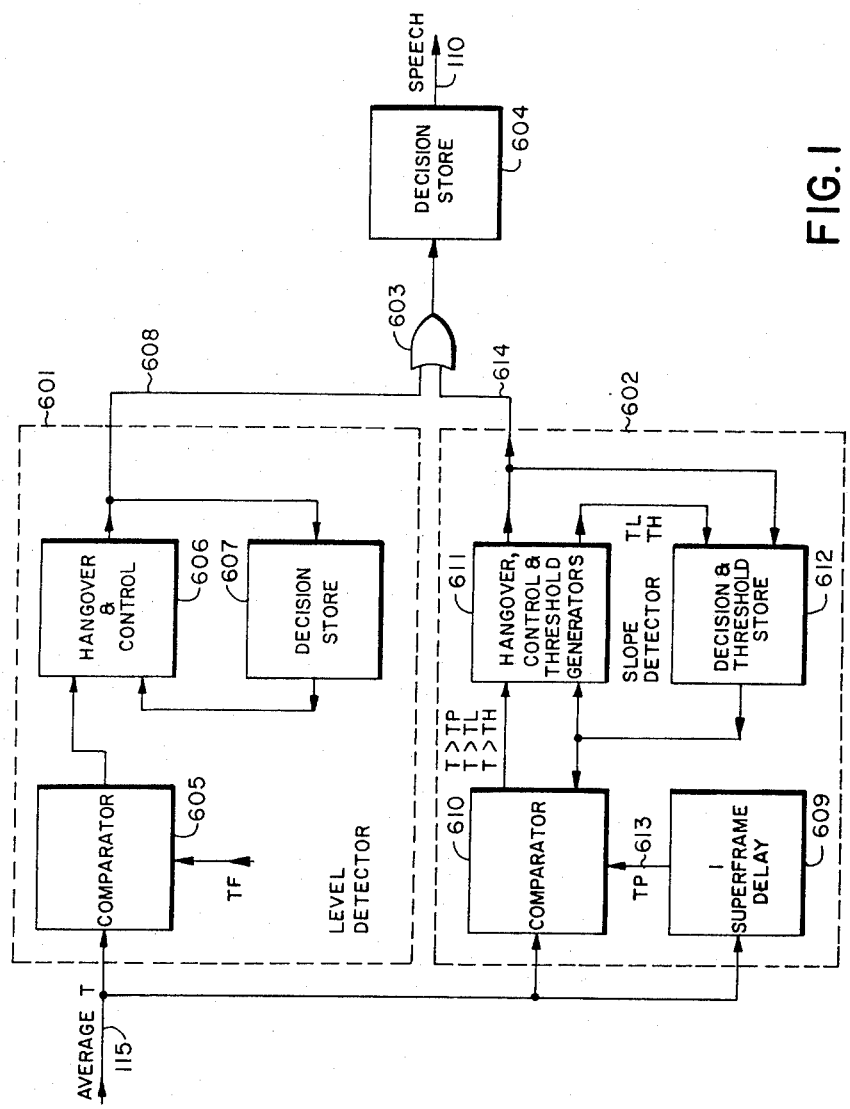
FIG. 1 illustrates in the form of a block diagram a speech detector for use in a DSI transmission system.
Figure 2:
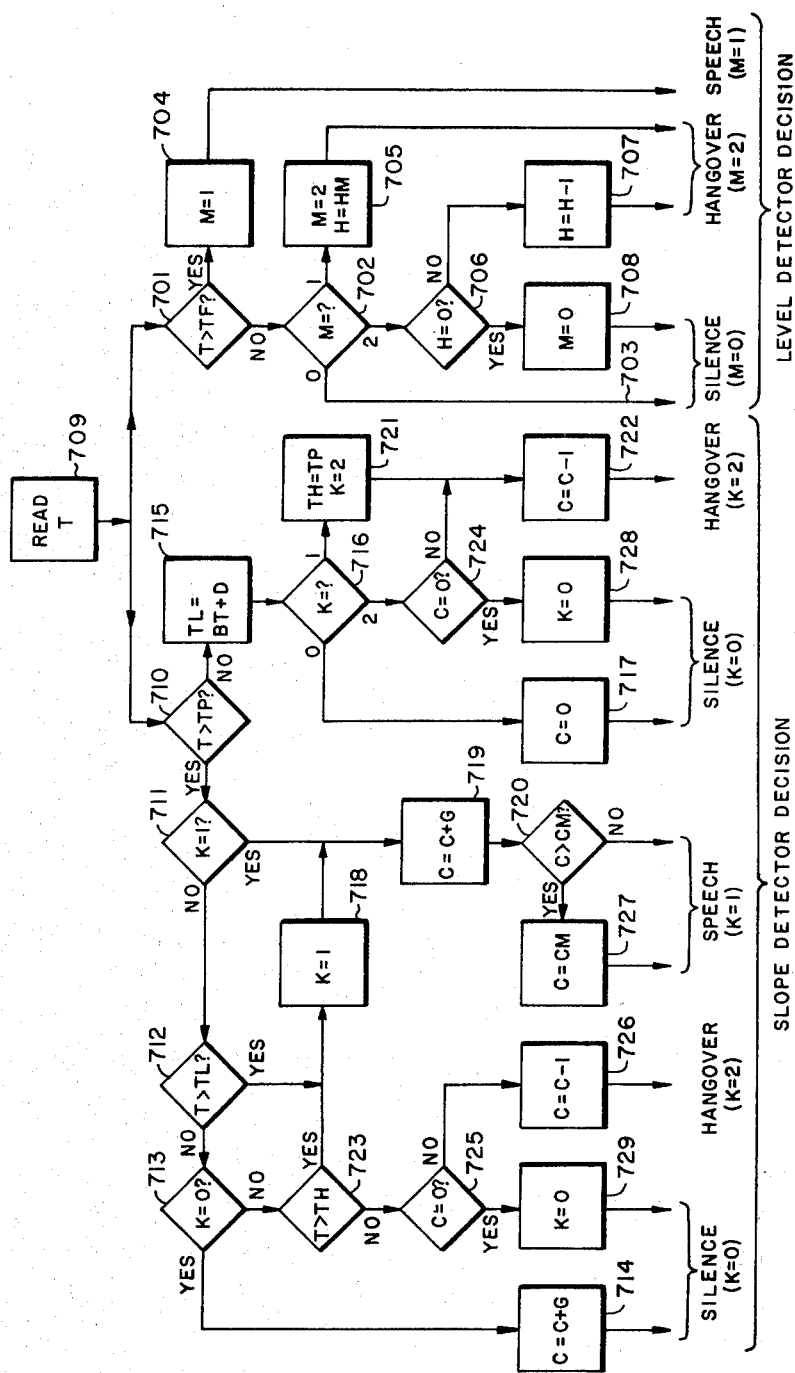
FIG. 2 shows a flow chart in explanation of the operation of the speech detector.
Figure 3:
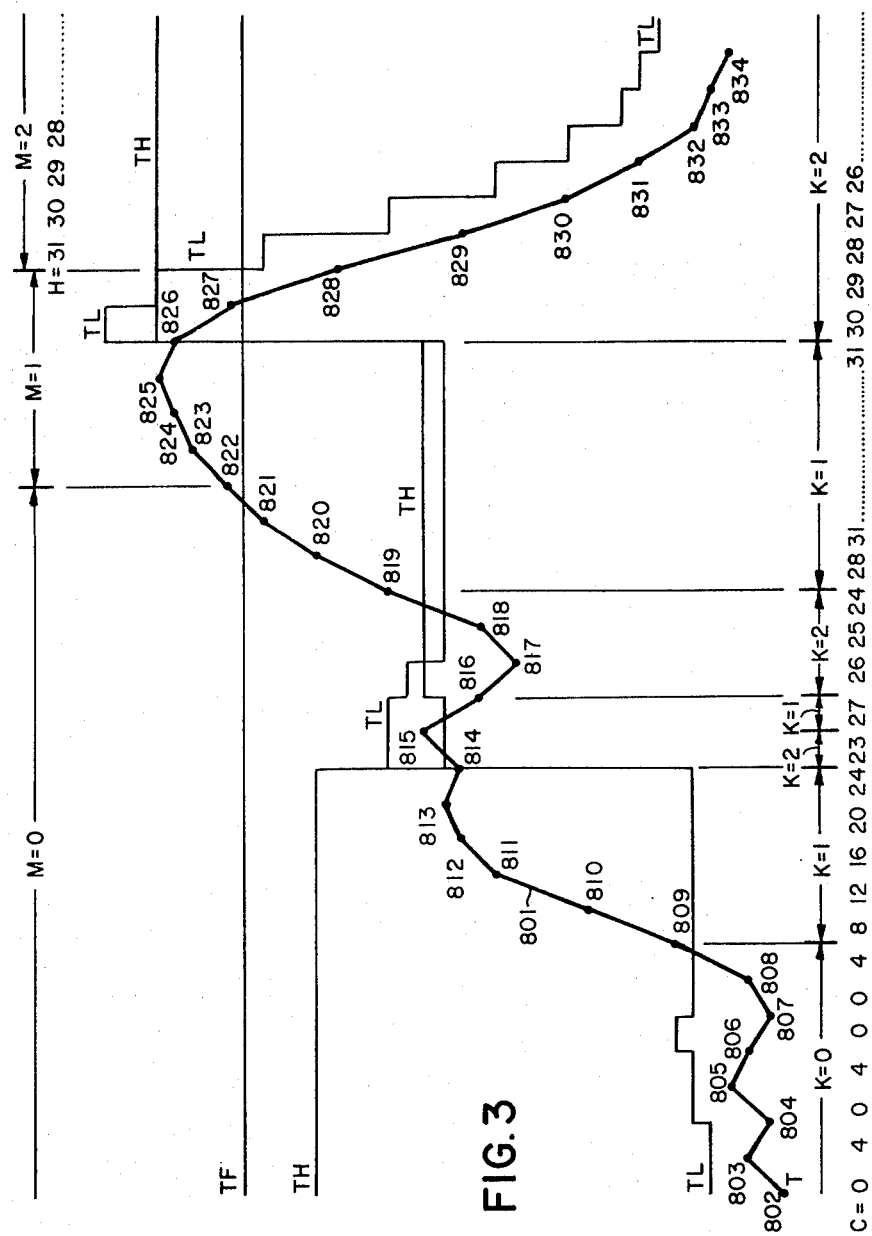
FIG. 3 is a signal level diagram illustrating the operation of the speech detector.

The speech detector described below with reference to FIGS. 1 to 3 is intended for use in a DSI transmission system of the type described in copending U.S. patent application No. 187,821 already referred to, in which once in each superframe a speech decision is updated for each of a plurality of voice signal channels in respect of each of which there is an individual sample contained in each of a plurality of frames forming the superframe. In the present case, it is assumed that in each superframe there are 27 frames each comprising 48 voice channel signal samples each of 8 bits.

Referring to FIG. 1, which shows the speech detector in the form of a block diagram, it will be seen that the speech detector includes two independent parts, which are referred to herein as the level detector 601 and the slope detector 602, whose outputs are combined in an OR gate 603 to produce for each channel a speech decision which is stored in a 48-channel decision store 604, to the output of which a speech decision output line 110 is connected. Each of the detectors 601 and 602 is supplied with a 7-bit average T, produced by the circuit described below with reference to FIG. 4, on lines 115, and is enabled in the fourteenth frame of each superframe to up-date the speech decision for each channel. In its preferred form, each of the detectors 601 and 602 comprises a read-only memory. The speech detector is required to be able to detect speech signals at low levels in order to avoid excessive clipping of speech signals at the start of speech utterances, but at the same time is required not to respond to relatively high levels of noise alone because this would undesirably increase the activity of the DSI transmission. In order to comply with these requirements, the speech detector is designed to exploit differences in the characteristics of noise and speech signals, namely that (a) speech signals usually have a higher level than noise, and (b) whereas noise is continuous, speech signals occur in bursts with the signal level progressively increasing at the start of each burst. It is to this end that the speech detector comprises the two detectors 601 and 602.

Each of the detectors 601 and 602 classifies each channel as being in one of three states, namely speech, hangover, and silence. For ease of reference, in FIGS. 2 and 3 these states are denoted by the value of an index, M for the level detector and K for the slope detector, each index having the value 0 for silence, 1 for speech, and 2 for hangover. Thus M=1 indicates that the level detector declares that the particular channel is carrying speech.

The hangover state is a temporary state which a channel is deemed to be in immediately following the speech state, and is provided to avoid speech clipping after intersyllabic pauses in speech. In each detector, a channel which previously was declared as being in the speech state, but in respect of which speech is no longer detected, is deemed to be in the hangover state and an initial hangover count is set. If speech is still not detected in successive superframes, then this hangover count is decremented until it reaches zero, when the channel is declared silent. The initial hangover count is fixed in the level detector but is variable in the slope detector, as is further explained below.

Referring again to FIG. 1, the level detector 601 consists of three parts, namely a comparator 604, a hangover and control unit 606, and a decision store 607. In frame 14 in each superframe, for each channel, the comparator 605 compares the average T with a fixed threshold TF which is above the highest possible noise level. The result of this comparison is supplied to the unit 606. The unit 606 determines the state of the channel in dependence upon this comparison and the channel's previous state as stored in the store 607, and stores the current state of the channel, and any hangover count which is applicable, in the store 607. The unit 606 supplies a logic 1 on the output line 608 if the channel is determined as being in either the speech or the hangover state.

The slope detector 602 consists of a delay unit 609, comparators 610, a hangover, control, and threshold generator unit 611, and a decision and threshold store 612. The delay unit 609 provides a delay of 1 superframe for the average T to provide a previous average TP via lines 613 to the comparators 610. In frame 14 in each superframe, for each channel, the comparators 610 compare the current average T with the previous average TP, a threshold TL, and a threshold TH and supply the comparison results to the unit 611. The thresholds TL and TH are variable thresholds which are stored for each individual channel in the store 612. The unit 611 determines the state of the channel in dependence upon the comparison results and the channel's previous state as stored in the store 612, generates new thresholds TL and TH if necessary, and stores the current state of the channel, together with any new hangover count and thresholds TL and TH, in the store 612. The unit 611 supplies a logic 1 on the output line 614 if the channel is determined as being in either the speech or the hangover state.

Thus it will be seen that the speech decision on the line 110 is present for each channel, i.e. the channel is deemed to be carrying speech, unless both the level detector and the slope detector declare the channel to be silent, i.e. both $M=0$ and $K=0$.

The operation of the speech detector will be further understood from the following description with reference to FIGS. 2 and 3. In FIG. 2 B, D, and G are integers, H is the hangover count in the level detector, HM is a maximum value of H, C is the hangover count in the slope detector, CM is a maximum value of C, and the other symbols have the meanings already described. For the illustration in FIG. 3 it has been assumed that $B=1$, $D=5$, $G=4$, and $CM=HM=31$. Each of FIGS. 2 and 3 relates to onlyone of the 48 channels, all the channels being treated in the same manner. FIG. 3 illustrates the average T for the channel as a line 801 on which each point represents the value of T in one superframe, and also illustrates the resultant values of M, H, TL, TH, K, and C. It is initially assumed that $M=K=C=0$. Successive points on the line 801 are identified by references 802 through 834.

Considering firstly the operation of the level detector, for each of the points 802 through 821 $T \not> TF$ (interrogation 701 in FIG. 2) and the previously stored value of M is zero (interrogation 702 in FIG. 2) so that in FIG. 2 the branch 703 is reached and M remains zero (silence). For each of the points 822 through 827 $T > TF$, so that, regardless of the previously stored value of M, M is set to 1 (speech) in block 704 in FIG. 2. For point 828 the result of the interrogation 701 is negative, so that the value of M is interrogated at block 702 in FIG. 2. The previously stored value of M is 1, so that block 705 in FIG. 2 is reached, M being set to 2 (hangover) and H being set to $HM=31$. For each of points 829 through 834 the result of the interrogation 701 is negative and the previously stored value of M, interrogated in block 702, is 2 so that in FIG. 2 the value of H is interrogated at block 706. For these points $H \neq 0$, so that H is decremented each time at block 707 in FIG. 2 and M is unchanged. Unless T again exceeds TF, this decrementing continues in successive superframes until $H=0$, when interrogation 706 has a positive result so that block 708 is reached in which M is set to zero (silence).

Considering now the operation of the slope detector, after reading the value T in each superframe (block 709 in FIG. 2), this value is compared with the previous value TP (interrogation 710 in FIG. 2). If $T > TP$, as at points 803, 805 and 808 in FIG. 3, then an interrogation is made as to whether $K=1$ (speech) in block 711 of FIG. 2. For each of the points 803, 805, and 808 the previous value of K is zero, so that the result of this interrogation is negative. In a subsequent interrogation 712 T is compared with the threshold TL, and for each of the points 803, 805, and 808 $T \not> TL$ so that a subsequent interrogation in block 713 is effected as to whether $K=0$. For each of these points the result of this interrogation is positive, so that in a block 714 the previous value of C is increased by $G=4$, K remaining unchanged.

For each of the points 804, 806, and 807 the result of the interrogation 710 is negative, so that in a block 715 the first threshold TL is set to $BT+D$, i.e. $T+5$ in FIG. 3. The previous value of K is then interrogated in a block 716, and, because in the case of each of these points the previous value of K is zero, C is set to zero in a block 717 and K remains unchanged. Thus for all of the points 803 to 808 $K=0$ (silence). It can be seen that the threshold TL is adaptively adjusted during this period, so that this threshold is generally a little above the level of noise present on the particular channel.

For the point 809 the interrogation 710 has a positive result, the subsequent interrogation 711 has a negative result, and the resultant interrogation 712 has a positive result because now $T > TL$, so that K is set to 1 (speech) in block 718 in FIG. 2. For each of the points 810 through 813 the interrogation 710 and the resultant interrogation 711 both have positive results. Thus for each of the points 809 through 813 C is increased by $G=4$ in a block 719; this gradual increasing of C, and hence the hangover period which will subsequently occur, reflects the increasing reliability of the speech decision reached initially at the point 809. C is in each case compared with $CM=31$ in an interrogation 720; for each of these points the result of this interrogation is negative so that no further action is taken.

For the point 814 $T < TP$, so that the first threshold TL is again reset in block 715. In this case the previous value of K interrogated in block 716 is 1, so that in a block 721 the threshold TH is set to the previous average value TP and K is set to 2 (hangover). Subsequently in a block 722 C is decreased by 1 to 23. For the point 815 T>TP, K≠1, T≯TL, and K≠0, so that an interrogation T>TH? (block 723 in FIG. 2) is reached whose result is positive. Accordingly, K is set to 1 in block 718 and C is increased in block 719. This recognizes the point 815 as comprising speech; this recognition is based on the fact that previously the lower-level point 813 was identified as comprising speech, so that the relatively higher-level point 815 is also assumed to comprise speech.

The point 816 results in a hangover decision (K=2) in the same manner as for the point 814, the thresholds TL and TH being reset and C being decreased by 1 to 26. For the point 817 T≯ TP so that the threshold TL is reset, and the interrogation 716 is reached and reveals that K=2, so that in an interrogation 724 C is assessed and, since it is not zero, is decreased by one in the block 722.

For the point 818 T>TP, K≠1, T≯TL, K≠0, and T≯TH, so that C is interrogated in a block 725 and, not being zero, is decreased by 1 in a block 726, K remaining unchanged. The point 819 and the points 820 through 825 result in the same circumstances as the points 809 and 810 through 813 respectively, except that for each of the points 820 through 825 increasing C in block 719 results in the interrogation C>CM? in block 720 having a positive result, so that for each of these points C is set to CM=31 in a block 727. At the point 826 both of the thresholds TL and TH are reset in the same manner as at the points 814 and 816, and a hangover decision (K=2) is reached so that C is reduced by one. In the same manner as for the point 817, at each of the points 827 through 834 the threshold TL is reset and C is reduced by 1. Unless the line 801 again crosses the threshold TL or TH, this reduction of C continues in successive superframes until C=0, when one of the interrogations 724 and 725 has a positive result so that in one of blocks 728 and 729 respectively K is set to zero (silence).

It can be seen, therefore, that the level detector 601 provides a reliable detection of the presence of speech each time that the average T exceeds the fixed threshold TF, and that after each such detection the speech decision on the line 110 is maintained for a fixed hangover period of 32 superframes, to maintain the decision during intersyllabic pauses in speech. On the other hand, the slope detector 602 provides a less reliable but much earlier detection of the start of speech bursts, as at the point 809, to produce the speech decision on the line 110 as quickly as possible and hence to avoid excessive clipping of speech signals at the start of speech bursts. As this detection is less reliable, the hangover period of the slope detector is not immediately set to the maximum as in the level detector; but instead is increased only gradually to avoid excessively increasing the activity of the DSI transmission. For example, the average T at the point 809 could alternatively be due to noise transients instead of the start of speech, in which case the line 801 would not rise after this point. In this case although the slope detector would reach the incorrect decision K=1 (speech) for the point 809, this decision would be maintained only for the short hangover period of 8 superframes so that the DSI transmission activity would be only slightly increased. In any event, as described below, the value T is itself an average taken over the duration of one superframe, and the threshold TL is adaptively adjusted to be above the average noise level of the channel, so that the slope detector is relatively insensitive to noise transients.

Figure 4:
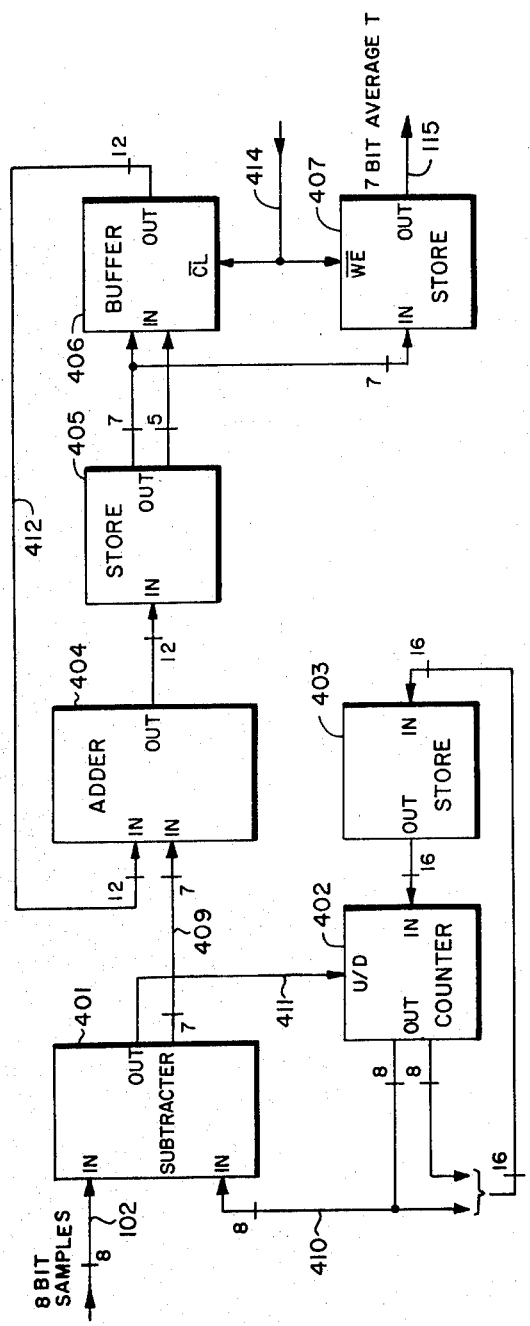
FIG. 4 illustrates an offset remover and averaging circuit for supplying offset-removed and averaged signal samples to the speech detector.

FIG. 4 illustrates in the form of a block diagram a d.c. offset remover and averaging circuit which serves to produce a 7-bit offset removed average T for each channel on the lines 115, from 8-bit individual signal samples of the channels supplied thereto on lines 102. The offset remover consists of an 8-bit subtracter 401, a 16-bit up/down counter 402, and a 48-channel by 16-bit store 403. The averaging circuit consists of a 12-bit adder 404, a 48-channel by 12-bit store 405, a buffer 406 having a clear input $\overline{CL}$, and a 48-channel by 7-bit store 407 having a write-enable input $\overline{WE}$. Each of the stores is addressed in turn for each channel via an address bus which is not shown.

The offset remover serves to produce on lines 409 for each channel a 7-bit magnitude signal from which long-term d.c. offsets have been removed, and to this end the offset remover in operation reaches an equilibrium state in which for each channel a 16-bit offset value of the channel is stored in the store 403. In each frame, for each channel, the stored offset value of the channel is loaded from the store 403 into the counter 402 and is available at the counter output. The 8 most significant bits of the offset value are applied via lines 410 to the subtracter 401, which subtracts the offset value bits from the current sample of the channel to produce the 7-bit magnitude signal on the lines 409 and a sign bit on a further output line 411. This line 411 is connected to an up/down counting control input U/D of the counter 402 and causes the count of the counter to be increased or decreased by 1 depending on the polarity of the sign bit on the line 411. The counter 402 thus produces a new, modified, 16-bit offset value for the channel at its output, and this new value is written into the store 403 in place of the previous offset value for the channel. This sequence is repeated for subsequent channels in each frame.

In the long term, the equilibrium state reached is such that for each channel the numbers of positive and negative sign bits produced on the line 411 are equal. Although the stored offset value of each channel varies, only the 8 most significant bits of this are subtracted from the channel information, and in fact 256 sign bits of one polarity are required in order to change the subtracted offset value bits by one step.

The averaging circuit serves to produce, for each channel, the 7-bit average T on the lines 115. In fact, in order to simplify implementation of the circuit the average T on the lines 115 is actually a fraction of 27/32 of the actual average of the signals on the lines 409. For each channel, this average T is updated in the thirteenth frame of each superframe by a signal applied via a line 414 to the input $\overline{CL}$ of the buffer 406 and the input $\overline{WE}$ of the store 407, to write a new average T into the store 407 and to clear the buffer 406.

For each channel in each frame of the superframe, the output of the adder 404 is stored in the store 405. The adder output is equal to the sum of the 7-bit magnitude signal of the particular channel, present on the lines 409, and a 12-bit cumulative sum for the particular channel present on lines 412. The cumulative sum for the channel is the previously stored sum for the channel which was stored in the store 405, which is clocked through the buffer 406 in each frame except the thirteenth frame of each superframe when, as described above, the buffer 406 is cleared to reduce the cumulative sum to zero.

In the thirteenth frame of each superframe, therefore, for each channel the 12-bit cumulative sum produced at the output of the store 405 is equal to the sum of the offset-removed magnitude signals for that channel during the preceding 27 frames. Only the 7 most significant bits of this sum are written into the store 407 to achieve a division by a factor of 32; hence the average T is 27/32 of the actual average. This minor difference does not adversely affect the operation of the speech detector.

Whilst a particular offset remover and averaging circuit has been described above, the speech detector of the invention can obviously be used in conjunction with other forms of such circuit or without any preceding offset remover and averaging circuit. Similarly, the speech detector can be used in other applications than that described, and can be provided in respect of any number of voice channel signals. Numerous and varied other arrangements can be provided without departing from the scope of the invention as defined in the claims.

What is claimed is:

1. A method of detecting the presence of speech signals in a sampled voice channel signal, comprising the steps of:
   producing a first signal state whenever the magnitude of a signal sample exceeds a first threshold level;
   comparing the magnitude of each sample with that of the preceding sample;
   whenever the magnitude of a sample is not greater than that of the preceding sample, setting a second threshold to a level which is greater than and is dependent upon the magnitude of the current sample;
   whenever the magnitude of a sample is greater than that of the preceding sample, producing a second signal state if the magnitude of the current sample exceeds the second threshold; and
   in response to each of the first and the second signal states, producing a signal, representing the presence of speech, at least in respect of the current sample.

2. A method as claimed in claim 1 and including the steps of:
   whenever the magnitude of a sample does not exceed the first threshold level and the first signal state was produced in respect to the preceding sample, producing a third signal state in respect to a first predetermined number of consecutive samples commencing with the current sample;
   whenever the magnitude of a sample is not greater than that of the preceding sample and the second signal state was produced in respect of said preceding sample, producing a fourth signal state in respect of a second number of consecutive samples commencing with the current sample; and
   producing the signal representing the presence of speech in response to each of the third and fourth signal states.

3. A method as claimed in claim 2 and including the step of determining said second number in dependence upon previous sample magnitudes, said second number being increased by a predetermined amount, up to a maximum number, for each sample in respect of which the second signal state is produced, and being decreased, down to a minimum number, for each sample whose magnitude is not greater than the magnitude of the preceding sample.

4. A method as claimed in claim 2 or 3 and including the steps of:
   whenever the magnitude of a sample exceeds that of the preceding sample, and in respect of said preceding sample the fourth signal state was produced but the second signal state was not produced, producing the second signal state in respect of the current sample if its magnitude exceeds a third threshold level; and
   setting the third threshold level equal to the magnitude of the preceding sample whenever the second signal state was produced in respect of said preceding sample and the magnitude of the current sample is not greater than the magnitude of said preceding sample.

5. A method as claimed in claim 1 wherein, each time that the second threshold level is set, it is set to be greater than the magnitude of the current sample by a predetermined amount.

6. A method as claimed in claim 1, 2, or 3 wherein each signal sample is constituted by an average of a plurality of individual samples of the voice channel signal, the method further comprising the step of producing each signal sample by removing d.c. offsets from and averaging a plurality of individual samples of the voice channel signal.

7. A speech detector comprising one or more read-only memories programmed and arranged to carry out the method of claim 1, 2, or 3.

8. A speech detector for detecting the presence of speech signals in a sampled voice channel signal, comprising:
   means for producing a first signal state whenever the magnitude of a signal sample exceeds a first threshold level;
   means for generating a second threshold;
   means for delaying each sample until the next sample;
   means for comparing the magnitude of each sample with that of the preceding sample delayed by said delaying means;
   means, responsive to said comparing means determining that the magnitude of a sample is not greater than that of the preceding sample, for setting the second threshold to a level which is greater than and is dependent upon the magnitude of the current sample;
   means, responsive to said comparing means determining that the magnitude of a sample is greater than that of the preceding sample, for producing a second signal state if the magnitude of the current sample exceeds the second threshold level; and
   means responsive to each of the first and second signal states for producing a signal, representing the presence of speech, at least in respect of the current sample.

9. A speech detector as claimed in claim 8 and including means for producing each signal sample by removing d.c. offsets from and averaging a plurality of individual samples of the voice channel signal.

10. A method of detecting the presence of speech in a sampled voice channel signal, comprising the steps of:
    setting a threshold, to a level which is greater than and is dependent upon the magnitude of the current sample, whenever the magnitude of the current sample is not greater than that of the preceding sample; and providing an indication of the presence of speech whenever the magnitude of the current sample is greater than that of the preceding sample and exceeds said threshold level.

11. A method as claimed in claim 10 and including maintaining said indication in respect of a number of samples following each sample whose magnitude is greater than that of the preceding sample.

12. A method as claimed in claim 11 and including the step of determining the number of samples in respect of which said indication is maintained in dependence upon previous sample magnitudes, said number being increased, up to a maximum number, for each sample whose magnitude is greater than that of the preceding sample and being decreased, down to a minimum number, for each sample whose magnitude is not greater than that of the preceding sample.

13. A method of claimed in claim 10, 11, or 12 and including the step of providing an indication of the presence of speech in respect of each sample whose magnitude exceeds a fixed threshold level.

* * * * *